US008274950B2

(12) United States Patent
Lee et al.

(10) Patent No.: US 8,274,950 B2
(45) Date of Patent: Sep. 25, 2012

(54) METHOD OF PERFORMING STATUS REPORT IN A MOBILE COMMUNICATION SYSTEM

(75) Inventors: Young Dae Lee, Anyang-si (KR); Sung Jun Park, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/312,980

(22) PCT Filed: Dec. 7, 2007

(86) PCT No.: PCT/KR2007/006361
§ 371 (c)(1),
(2), (4) Date: Jun. 3, 2009

(87) PCT Pub. No.: WO2008/069618
PCT Pub. Date: Jun. 12, 2008

(65) Prior Publication Data
US 2009/0303893 A1 Dec. 10, 2009

Related U.S. Application Data

(60) Provisional application No. 60/869,073, filed on Dec. 7, 2006.

(30) Foreign Application Priority Data

Jan. 11, 2007 (KR) ........................ 10-2007-0003284

(51) Int. Cl.
*H04W 4/00* (2009.01)
*H04W 36/00* (2009.01)
*G01R 31/08* (2006.01)

(52) U.S. Cl. ......... 370/332; 370/236; 370/333; 455/436

(58) Field of Classification Search .................. 370/236, 370/331, 332; 455/436
See application file for complete search history.

(56) References Cited

U.S. PATENT DOCUMENTS 6,470,391 B2 10/2002 Takamoto et al.
(Continued)

FOREIGN PATENT DOCUMENTS

CN 1595362 3/2005
(Continued)

OTHER PUBLICATIONS

Samsung: "DL Control Channel Structure: Overview", 3GPP TSG-RAN WG1, R1-062534, Oct. 9, 2006, sections 1-4. Ericsson: "E_UTRA Downlink Control Signaling—Open Issues", 3GPP TSG-RAN WG1, R!061365, May 8, 2006, section 2.

(Continued)

*Primary Examiner* — Ricky Ngo
*Assistant Examiner* — Paul H Masur
(74) *Attorney, Agent, or Firm* — McKenna Long & Aldridge LLP (57) ABSTRACT

A method of performing reception status report in a mobile communication system is disclosed. The method of performing reception status report in a specific protocol layer of a user equipment which receives data transmitted from a base station in a mobile communication system includes performing reception status report of at least one first data block in the protocol layer in accordance with a first value of at least one parameter, the at least one first data block being transmitted from the base station, changing the first value of the at least one parameter to a second set value if a previously set event occurs or if at least one condition is satisfied and performing reception status report of at least one second data block in accordance with a second set value of the at least one parameter, the at least one second data block being transmitted from the base station.

6 Claims, 6 Drawing Sheets

U.S. PATENT DOCUMENTS

| | | | |
|---|---|---|---|
| 6,665,313 B1 | 12/2003 | Chang et al. | |
| 6,697,347 B2 | 2/2004 | Ostman et al. | |
| 6,778,501 B1 | 8/2004 | Malmgren et al. | |
| 7,006,464 B1 | 2/2006 | Gopalakrishnan et al. | |
| 7,054,288 B2 | 5/2006 | Sternberg et al. | |
| 7,158,504 B2 | 1/2007 | Kadaba et al. | |
| 7,295,573 B2 | 11/2007 | Yi et al. | |
| 7,359,924 B2 | 4/2008 | Balachandran et al. | |
| 7,542,457 B2* | 6/2009 | Wu | 370/346 |
| 7,590,181 B2 | 9/2009 | Awad et al. | |
| 7,593,694 B2 | 9/2009 | Michel et al. | |
| 7,623,483 B2 | 11/2009 | Yi et al. | |
| 7,639,644 B2 | 12/2009 | Sternberg et al. | |
| 7,646,742 B2* | 1/2010 | Petrovic et al. | 370/328 |
| 7,764,661 B2 | 7/2010 | Heo et al. | |
| 7,801,563 B2 | 9/2010 | Hara et al. | |
| 7,894,390 B2 | 2/2011 | Nakamata et al. | |
| 7,912,471 B2 | 3/2011 | Kodikara Patabandi et al. | |
| 8,054,786 B2 | 11/2011 | Wu et al. | |
| 8,054,788 B2 | 11/2011 | Ma et al. | |
| 8,090,390 B2 | 1/2012 | Lee et al. | |
| 2002/0170013 A1 | 11/2002 | Bolourchi et al. | |
| 2002/0174276 A1 | 11/2002 | Jiang | |
| 2003/0040314 A1 | 2/2003 | Hogan et al. | |
| 2003/0095519 A1 | 5/2003 | Kuo et al. | |
| 2003/0152083 A1 | 8/2003 | Nagata et al. | |
| 2003/0157953 A1 | 8/2003 | Das et al. | |
| 2003/0181221 A1 | 9/2003 | Nguyen | |
| 2003/0210669 A1 | 11/2003 | Vayanos et al. | |
| 2003/0214935 A1 | 11/2003 | Khan et al. | |
| 2003/0231612 A1 | 12/2003 | Kim et al. | |
| 2004/0103435 A1 | 5/2004 | Yi et al. | |
| 2004/0228294 A1 | 11/2004 | Kim et al. | |
| 2004/0266461 A1 | 12/2004 | Beckmann et al. | |
| 2005/0039101 A1* | 2/2005 | Torsner | 714/748 |
| 2005/0083943 A1 | 4/2005 | Lee et al. | |
| 2005/0111487 A1 | 5/2005 | Matta et al. | |
| 2005/0207343 A1 | 9/2005 | Han | |
| 2005/0220116 A1 | 10/2005 | Ahn et al. | |
| 2005/0237960 A1 | 10/2005 | Kim | |
| 2005/0250506 A1 | 11/2005 | Beale et al. | |
| 2006/0018294 A1 | 1/2006 | Kynaslahti et al. | |
| 2006/0067238 A1* | 3/2006 | Olsson et al. | 370/242 |
| 2006/0092911 A1 | 5/2006 | Hwang et al. | |
| 2006/0092973 A1 | 5/2006 | Petrovic et al. | |
| 2006/0114877 A1 | 6/2006 | Heo et al. | |
| 2006/0140158 A1 | 6/2006 | Terry | |
| 2006/0148411 A1 | 7/2006 | Cho et al. | |
| 2006/0183429 A1 | 8/2006 | Anderson | |
| 2006/0203760 A1 | 9/2006 | Fukui et al. | |
| 2006/0245386 A1 | 11/2006 | Hu | |
| 2006/0251019 A1 | 11/2006 | Dalsgaard et al. | |
| 2006/0251105 A1 | 11/2006 | Kim et al. | |
| 2006/0268919 A1 | 11/2006 | Malladi et al. | |
| 2007/0014229 A1 | 1/2007 | Hepler et al. | |
| 2007/0047452 A1* | 3/2007 | Lohr et al. | 370/242 |
| 2007/0064602 A1* | 3/2007 | Jiang | 370/229 |
| 2007/0091810 A1* | 4/2007 | Kim et al. | 370/236 |
| 2007/0254679 A1 | 11/2007 | Montojo et al. | |
| 2007/0293222 A1 | 12/2007 | Vikberg et al. | |
| 2008/0045272 A1 | 2/2008 | Wang et al. | |
| 2008/0056148 A1* | 3/2008 | Wu | 370/252 |
| 2008/0056183 A1 | 3/2008 | Gorokhov et al. | |
| 2008/0084844 A1 | 4/2008 | Reznik et al. | |
| 2008/0101270 A1 | 5/2008 | Kekki et al. | |
| 2008/0101280 A1 | 5/2008 | Gholmieh et al. | |
| 2008/0117891 A1 | 5/2008 | Damnjanovic et al. | |
| 2008/0165724 A1 | 7/2008 | Wu et al. | |
| 2008/0165755 A1 | 7/2008 | Marinier et al. | |
| 2008/0273610 A1 | 11/2008 | Malladi et al. | |
| 2009/0028123 A1* | 1/2009 | Terry et al. | 370/341 |
| 2009/0088185 A1 | 4/2009 | Beale | |
| 2009/0221293 A1 | 9/2009 | Petrovic et al. | |
| 2009/0268676 A1 | 10/2009 | Wigard et al. | |
| 2010/0034139 A1 | 2/2010 | Love et al. | |
| 2010/0091721 A1* | 4/2010 | Larmo et al. | 370/329 |
| 2011/0190001 A1 | 8/2011 | Kodikara Patabandi et al. | |

FOREIGN PATENT DOCUMENTS

| | | |
|---|---|---|
| CN | 1805594 A | 7/2006 |
| CN | 1805596 | 7/2006 |
| EP | 1 432 261 | 6/2004 |
| EP | 1 724 948 | 11/2006 |
| EP | 1 755 355 | 2/2007 |
| EP | 1 843 504 | 10/2007 |
| EP | 1 845 649 | 10/2007 |
| EP | 1 845 650 | 10/2007 |
| JP | 2002-247042 | 8/2002 |
| JP | 2002-527945 | 8/2002 |
| JP | 2002-290413 | 10/2002 |
| JP | 2003-304574 | 10/2003 |
| JP | 2005-160079 | 6/2005 |
| JP | 2005-525065 | 8/2005 |
| JP | 2006-121282 | 5/2006 |
| JP | 2006-121394 | 5/2006 |
| JP | 2006-148490 | 6/2006 |
| JP | 2006-237897 | 9/2006 |
| JP | 2006-524444 | 10/2006 |
| JP | 2006-524969 | 11/2006 |
| JP | 2006-352708 | 12/2006 |
| JP | 2009-535957 | 10/2009 |
| RU | 2004-132193 | 4/2005 |
| RU | 2005-116242 A | 11/2005 |
| RU | 2004-126160 | 1/2006 |
| WO | WO 97/11566 | 3/1997 |
| WO | WO 98/24250 | 6/1998 |
| WO | WO 02/093296 | 11/2002 |
| WO | WO 03/084095 A1 | 10/2003 |
| WO | WO 03/085874 | 10/2003 |
| WO | WO 03/096149 | 11/2003 |
| WO | WO 03/096567 | 11/2003 |
| WO | WO 2004/017541 A1 | 2/2004 |
| WO | WO 2004/042952 | 5/2004 |
| WO | WO 2005/015801 | 2/2005 |
| WO | WO 2005/119941 | 12/2005 |
| WO | WO 2005/125252 | 12/2005 |
| WO | WO 2006/022876 | 3/2006 |
| WO | WO 2006/105333 | 10/2006 |
| WO | WO 2006/118418 | 11/2006 |
| WO | WO 2007/068304 | 6/2007 |

OTHER PUBLICATIONS

Rapporteur (Motorola): "Report of E-Mail Discussion: DL Scheduling", 3GPP TSG-RAN WG1, R1-063684, Dec. 12, 2006, section 2, annex C.

LG Electronic: "Downlink control signaling", 3GPP TSG_RAN WG!, R1-063177, Nov. 6, 2006, sections 1-2.

Texas Instruments: "Control Channel Structure and Coding in E-UTRA Downlink", 3GPP TSG-RAN WG1, R1-063220, Nov. 6, 2006, sections 1-5.

Sharp: "UE Identity in L1/L2 Control Signaling for Downlink Scheduling Resource Allocation", 3GPP TSG-RAN WG2, R2-061129, May 8, 2006, sections 1-3.

Nokia: "ARQ Operation with HARQ-ARQ Interaction", 3GPP TSG-RAN WG2, R2-062765, Oct. 9, 2006, sections 2-3.

Ericsson: "Uplink HARQ-ARQ Interactions for NACK—> ACK Error", 3GP TSG-RAN WG2, R2-063238, Nov. 6, 2006, fig. 1, p. 2.

Samsung: "MAC functions: ARQ", 3GP TSG-RAN WG2, R2-060374, Feb. 13, 2006, section 2.

Herrmann, C. et al., "Improving Packet Loss Probability in the UMTS High-Speed Downlink", IEEE Vehicular Technology Conference, VTC Fall 2003, Oct. 6, 2003, pp. 2655-2659.

"Universal Mobile Telecommunications System (UMTS); User Equipment (UE) procedures in idle mode and procedures for cell reselection in connected mode (3GPP TS 25.304 version 7.1.0 Release 7); ETSI TS 125 304", ETSI Standards, Dec. 2006, XP014039981.

"Universal Mobile Telecommunications System (UMTS); High Speed Downlink Packet Access (HSDPA); Overall description; Stage 2 (3GPP TS 25.308 version 7.1.0 Release 7); ETSI TS 125 308", ETSI Standards, LIS, Dec. 2006, XP014039997.

3$^{rd}$ Generation Partnership Project:Technical Specification Group Radio Access Network, Physical Layers Aspects for Evolved UTRA (Release 7), 3GPP TR 25.814, v1.5.0, May 2006.

R2-061189: Further discussion on delay enhancements in Re17 3GPP Nokia, TSG-RAN WG2 Meeting #53, Shanghai, China, 8$^{th}$-12$^{th}$ of May 2006.

* cited by examiner

METHOD OF PERFORMING STATUS REPORT IN A MOBILE COMMUNICATION SYSTEM

This application claims priority to PCT/KR2007/006361 filed on Dec. 7, 2007, U.S. Provisional Application No. 60/869,073 filed Dec. 7, 2006, and Korean Patent Application No. 10-2007-0003284 filed on Jan. 11, 2007, all of which are hereby incorporated by reference in their entirety.

TECHNICAL FIELD

The present invention relates to a mobile communication system, and more particularly, to a method of performing status report in a mobile communication system and a user equipment for the same.

BACKGROUND ART

Figure 1:
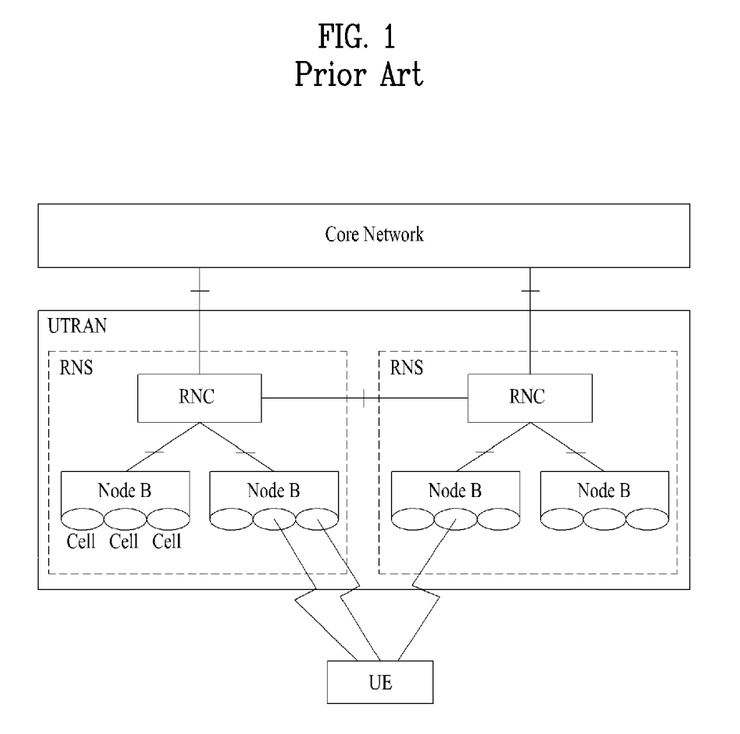
FIG. 1 illustrates a network structure of a UMTS (Universal Mobile Telecommunications System)

FIG. 1 illustrates a network structure of a universal mobile telecommunications system (UMTS).

The UMTS includes a user equipment (UE), a UMTS terrestrial radio access network (UTRAN), and a core network (CN). The UTRAN includes at least one radio network subsystems (RNS), wherein each RNS includes a radio network controller (RNC) and at least one base station (Node B) managed by the RNC. At least one cell exists in one Node B. Also, since the UMTS is a cellular based communication system, handover is performed as a user equipment moves from a current cell, to which the user equipment belongs, to another cell. A base station of a cell to which the user equipment currently belongs will be referred to as a source base station (source eNB), and a base station of a cell to which the user equipment will newly accesses will be referred to as a target base station (target eNB).

In a communication system suggested in a long term evolution (LTE), when handover is performed, user data of all downlinks, which are stored in the source base station, are forwarded to the target base station, and user data of all uplinks, which have been successfully received in the source base station, are transmitted to the core network. All new downlink user data which have reached the core network during a handover procedure are directly transmitted from the core network to the target base station. Afterwards, the target base station transmits all the user data, which have been received from its core network and the source base station, to the user equipment.

However, the aforementioned handover procedure according to the related art may cause waste of radio and wire resources for the following reasons.

First of all, even in case that the source base station has transmitted random downlink user data to the user equipment and the user equipment has normally received corresponding data, if transmission and reception acknowledgement information of the data is not forwarded to the target base station, the target base station determines that the user equipment has not received the data and should transmit the same user data to the user equipment again.

Likewise, even in case that uplink user data transmitted from the user equipment have been successfully received in the source base station, if their transmission and reception acknowledgement information is not forwarded to the user equipment, the user equipment determines that transmission of the user data has been failed and should transmit the same user data to the target base station again.

Such repeated transmission of the same data under the circumstances that radio resources are limited means that an opportunity for transmitting new data is missed. Since this means that the user data cannot be transmitted within a limited time period, a problem occurs in that a transmission rate may seriously be deteriorated.

Secondly, it may be considered that the user equipment moves from one base station to another base station. Considering a data flow of a downlink in an E-UTRAN system, the user data are arrived in aGW in an external internet network, and undergo encoding and header compression therein and then are forwarded to the base station to which the user equipment currently accesses. The RLC of the base station (eNB) reconstructs each user data block suitable for a wireless environment of a transmission timing point and then RLC PDUs to a corresponding user equipment.

At this time, it may be considered that the user equipment is located at the boundary between regions managed by two base stations, i.e., the current user equipment is connected with the base station A and enters the base station B while moving. In this case, the wireless environment between the user equipment and the base station A becomes poorer whereas the wireless environment between the user equipment and the base station B becomes better. This means that the probability that the RLC PDU transmitted from the base station A will not be successfully arrived in the user equipment becomes increased. At this time, the base station A determines that a connection point of the user equipment should be changed to the base station B, and commands the user equipment to connect with the base station B.

In this case, the data blocks which the base station A has not successfully transmitted to the user equipment should be forwarded from the base station A to the base station B, so that the base station B can transmit the data blocks to the user equipment again. However, re-transmission of the data which have been successfully received in the user equipment should be avoided within the limits of the possible. This is because that unnecessarily repeated transmission of the same data may be a waste when considering that possible radio resources are limited. Accordingly, it is necessary to reduce forwarding of the data blocks, which have been successfully received in the user equipment, from the base station A to the base station B within the limits of the possible.

DISCLOSURE OF THE INVENTION

Accordingly, the present invention is directed to a method of performing status report in a mobile communication system and a user equipment for the same, which substantially obviate one or more problems due to limitations and disadvantages of the related art.

An object of the present invention is to provide a method of performing status report in a mobile communication system and a user equipment for the same, in which repeated transmission of same data is avoided in the mobile communication system to efficiently use radio resources.

To achieve these objects and other advantages and in accordance with the purpose of the invention, as embodied and broadly described herein, a method of performing reception status report in a specific protocol layer of a user equipment which receives data transmitted from a base station in a mobile communication system comprises performing reception status report of at least one first data block in the protocol layer in accordance with a first value of at least one parameter, the at least one first data block being transmitted from the base station, changing the first value of the at least one parameter to a second set value if a previously set event occurs or if at least one condition is satisfied, and performing reception status report of at least one second data block in accordance with a second set value of the at least one parameter, the at least one second data block being transmitted from the base station.

In another aspect of the present invention, a user equipment, which performs reception status report of data transmitted from a base station in a mobile communication system, is configured to perform the steps of performing reception status report of at least one first data block in the protocol layer in accordance with a first value of at least one parameter, the at least one first data block being transmitted from the base station, changing the first value of the at least one parameter to a second set value if a previously set event occurs or if at least one condition is satisfied, and performing reception status report of at least one second data block in accordance with a second set value of the at least one parameter, the at least one second data block being transmitted from the base station.

BEST MODE FOR CARRYING OUT THE INVENTION

Hereinafter, structures, operations, and other features of the present invention will be understood readily by the preferred embodiments of the present invention, examples of which are illustrated in the accompanying drawings.

The present invention can be applied to a downlink or uplink of various kinds of communication systems. The downlink means communication from a base station (BS) to a mobile station (MS), and the uplink means communication from a user equipment to a base station. The base station generally means a fixed station which communicates with a user equipment, and may be referred to as other terminologies such as node-B, base transceiver system (BTS), and access point. The user equipment may be fixed or have mobility, and may be referred to as other terminologies such as user terminal (UT), subscriber station (SS), and wireless device.

Particularly, the present invention can be applied to a cellular based communication system. Accordingly, a protocol structure of UMTS which is a representative cellular system will be described, and then a method of transmitting status information based on UMTS and a user equipment for implementing the same will be described in detail.

Figure 2:
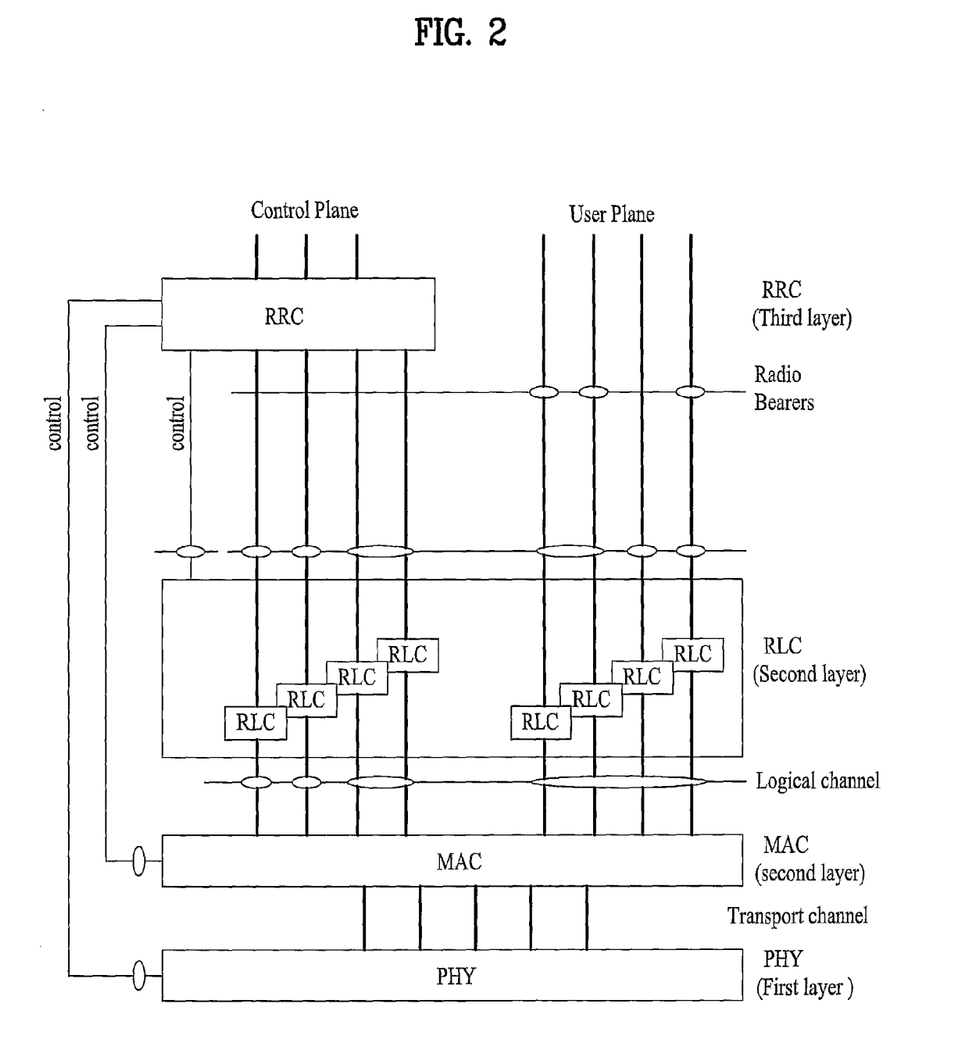
FIG. 2 is a block diagram illustrating a structure of a radio protocol used in UMTS.

FIG. 2 is a block diagram illustrating a structure of a radio protocol used in the UMTS. Radio protocol layers as shown exist in pairs in the user equipment and the UTRAN, and are in charge of data transmission of a radio interval.

A physical (PHY) layer which is a first layer serves to transmit data to a radio interval by using various radio transmission techniques, and a reliable data PHY layer is connected with a medium access control (MAC) layer through a transport channel, wherein the MAC layer is an upper layer of the PHY layer.

MAC, RLC, PDCP, and BMC (Broadcast/Multicast Control) layers exist in a second layer.

The MAC layer serves to map various logical channels with various transport channels, and also serves to perform logical channel multiplexing which maps several logical channels with one transport channel. The MAC layer is connected with the Radio Link Control (RLC) layer through a logical channel, wherein the RLC layer is an upper layer of the MAC layer. The logical channel is divided into a control and a traffic channel depending on types of transmitted information, wherein the control channel transmits information of a control plane and the traffic channel transmits information of a user plane.

The RLC layer serves to ensure QoS for each radio bearer (RB) and transmit data thereof. The RLC layer will be described later.

The BMC layer exists above the RLC layer, schedules a cell broadcast message, and broadcasts the cell broadcast message to user equipments located in a specific cell. The PDCP layer is located above the RLC layer, and allows data to be efficiently transmitted in a radio interval having a relatively small bandwidth by using IP packet such as IPv4 or IPv6.

A radio resource control (RRC) layer located in a third layer is defined in a control plane only, controls parameters of the first and second layers in respect of setup, re-setup and release of the RBs, and serves to control logical channels, transport channels and physical channels.

Hereinafter, the RLC layer which is a background of a main operation of the present invention will be described.

A basic function of the RLC layer is to ensure QoS of each RB and transmit data thereof. Since the RB service is a service provided to an upper layer by the second layer of the radio protocol, QoS is affected by the entire of the second layer. Especially, QoS is greatly affected by the RLC layer. The RLC layer provides an independent RLC entity for each RB to ensure unique QoS of RB, and also provides three RLC modes, i.e., a transparent mode (TM), an unacknowledged mode (UM), and an acknowledged mode (AM) to support various kinds of QoS. Since the three RLC modes respectively support different kinds of QoS, they are different from one another in their operation method and their detailed function. Accordingly, the RLC layer should be considered depending on its operation mode.

The TM RLC is a mode which does not add any overhead to RLC service data unit (SDU) transmitted from its upper level in constituting RLC PDU. In other words, the TM RLC is referred to in that the RLC passes through SDU in a transparent mode. The TM RLC serves to perform the following functions in the user plane and the control plane owing to its characteristic as aforementioned.

In the user plane, since a data processing time is short within the RLC, the TM RLC serves to transmit real time circuit data such as voice or streaming of a circuit service domain (CS domain). Also, in the control plane, since there is no overhead within the RLC, the TM RLC serves to transmit RRC message from an unspecified user equipment in case of an uplink, and serves to transmit RRC message broadcasted to all user equipments within a cell in case of a downlink.

Unlike the transparent mode, a mode in which overhead is added to the RLC SDU will be referred to as a non-transparent mode. The non-transparent mode includes the unacknowledged mode (UM) having no acknowledgement for data transmission and the acknowledged mode (AM) having acknowledgement for data transmission.

The UM RLC transmits PDUs by adding a PDU header, which includes a sequence number (SN), to each PDU, so that a receiving side can identify which PDU has been lost during transmission. In accordance with this function, in the user plane, the UM RLC serves to transmit broadcast/multicast data or transmit real time packet data such as voice (e.g., VoIP) or streaming of a packet service domain (PS domain). Also, in the control plane, the UM RLC serves to transmit RRC message which does not require acknowledgement, among RRC messages transmitted to a specific user equipment or a specific user equipment group within a cell.

Like the UM RLC, the AM RLC configures PDUs by adding a PDU header including SN thereto. However, the AM RLC is different from the UM RLC in that the receiving side acknowledges the transmitted PDUs. The reason why the receiving side acknowledges the transmitted PDUs in the AM RLC is to request a transmitting side to re-transmit PDU which the receiving side has not received. Accordingly, the AM RLC is to ensure error-free data transmission through re-transmission. For this reason, the AM RLC serves to transmit unreal time packet data such as TCP/IP of the PS domain in the user plane. Also, in the control plane, the AM RLC serves to transmit RRC message which necessarily requires acknowledgement, among RRC messages transmitted to a specific user equipment within a cell.

In view of a directional aspect, the TM RLC and the UM RLC are used for uni-directional communication whereas the AM RLC is used for bi-directional communication due to a predetermined feedback from the receiving side. Since such bi-directional communication is mainly used in point-to-point communication, the AM RLC uses a dedicated logical channel only.

In view of a structural aspect, in the TM RLC and the UM RLC, one RLC entity only corresponds to either the transmitting side or the receiving side. On the other hand, in the AM RLC, both the transmitting side and the receiving side exist in one RLC entity.

Meanwhile, the AM RLC includes a re-transmission buffer for managing retransmission in addition to a transmission and reception buffer, and uses a transmission and reception window for flow control.

The transmitting side of the AM RLC requests a receiving side of a peer RLC entity through polling to provide status information, and the receiving side of the AM RLC transmits a status report to a transmitting side of the peer RLC entity to report its data status. The status report is transmitted in a type of status PDU, and status PDU is transmitted into a data PDU by piggyback to enhance efficiency of data transmission.

In addition, there are provided a reset PDU and a reset ACK PDU. The reset PDU allows an AM RLC entity to request the other AM RLC entity to reset all operations and parameters when a significant error is found during an operation procedure. The reset ACK PUD is used for acknowledgement of the reset PDU. To support the above functions, the AM RLC needs several protocol parameters, status parameters, and timer. Like the aforementioned status PDU, piggyback status PDU, reset PDU, and reset ACK PDU, PDUs used to control data transmission in the AM RLC will be referred to as control PDUs, and PDUs used to transfer user data will be referred to as data PDUs.

Figure 3:
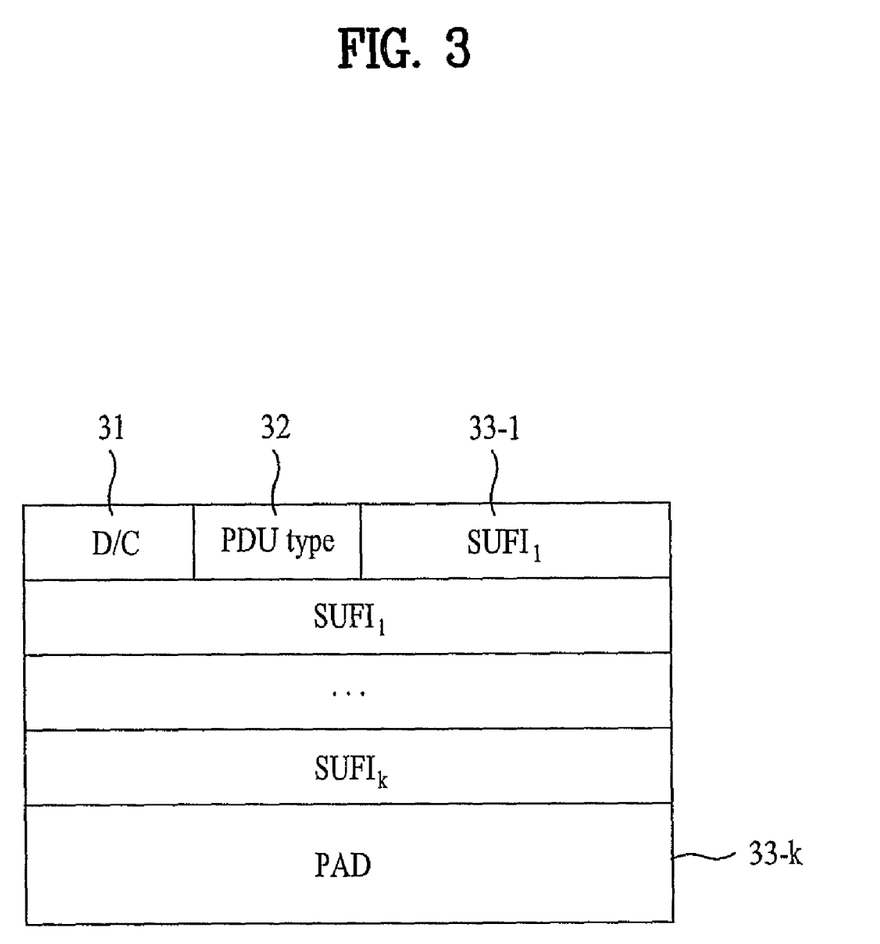
FIG. 3 illustrates a structure of a status PDU of a control PDU.

A structure of a status PDU of the control PDU will be described in detail with reference to FIG. 3.

A D/C field 31 identifies whether a corresponding PDU is a data PDU or a control PDU. A PDU type field 32 specifies whether a corresponding PDU is a status PDU, a piggyback status PDU, a reset PDU, or a reset ACK PDU. The status PDU includes a plurality of super fields (SUFIs) 33-1, . . . , 33-k. The SUFI indicates information as to which AM RLC PDU has been arrived in the receiving side and which AM RLC PDU has not been arrived in the receiving side, or indicates that the transmitting side will not transmit data any more as it has deleted some RLC SDU. The SUFI is divided into three parts of type, length, and value. The size of the status PDU is variable but is limited to the size of the greatest RLC PDU of a logical channel to which the status PDU is transmitted.

Figure 4A:
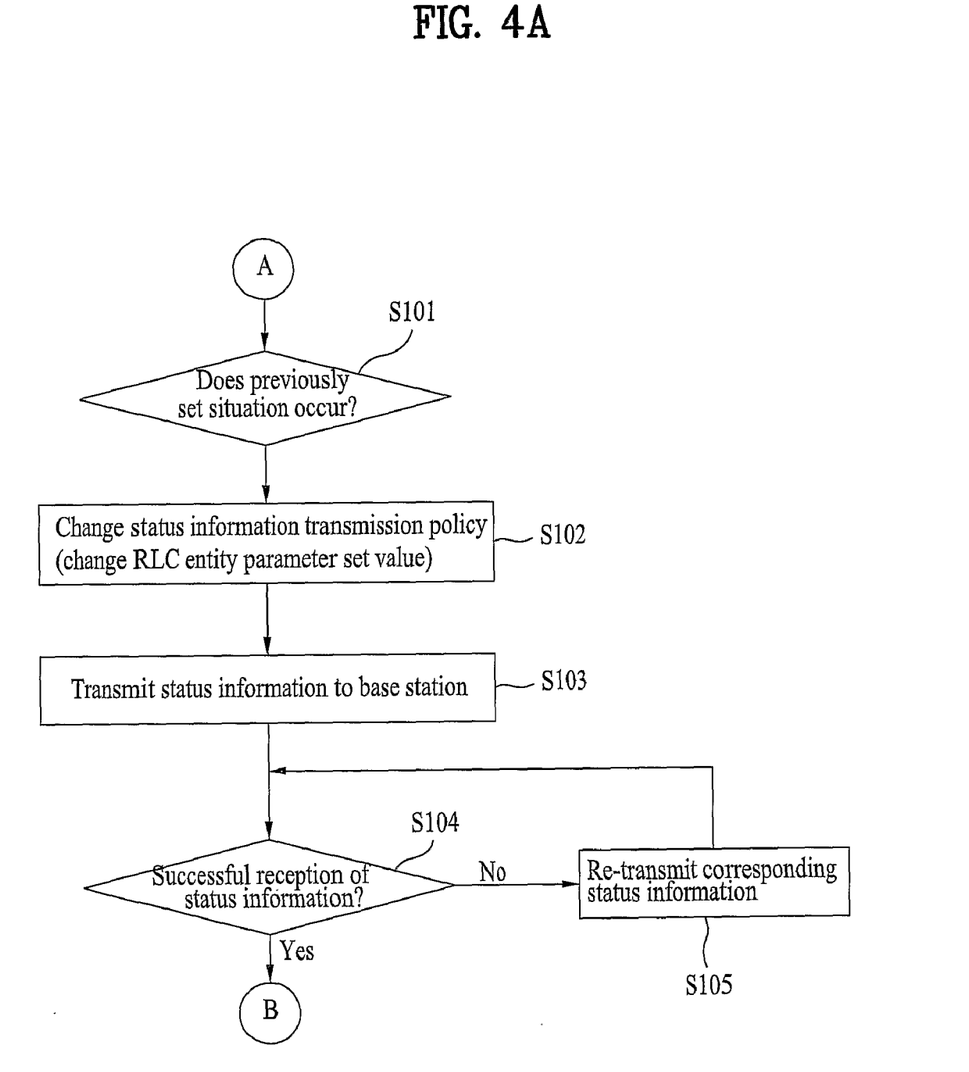
FIG. 4A is a flow chart illustrating a method of transmitting status information in accordance with the preferred embodiment of the present invention.
Figure 4B:
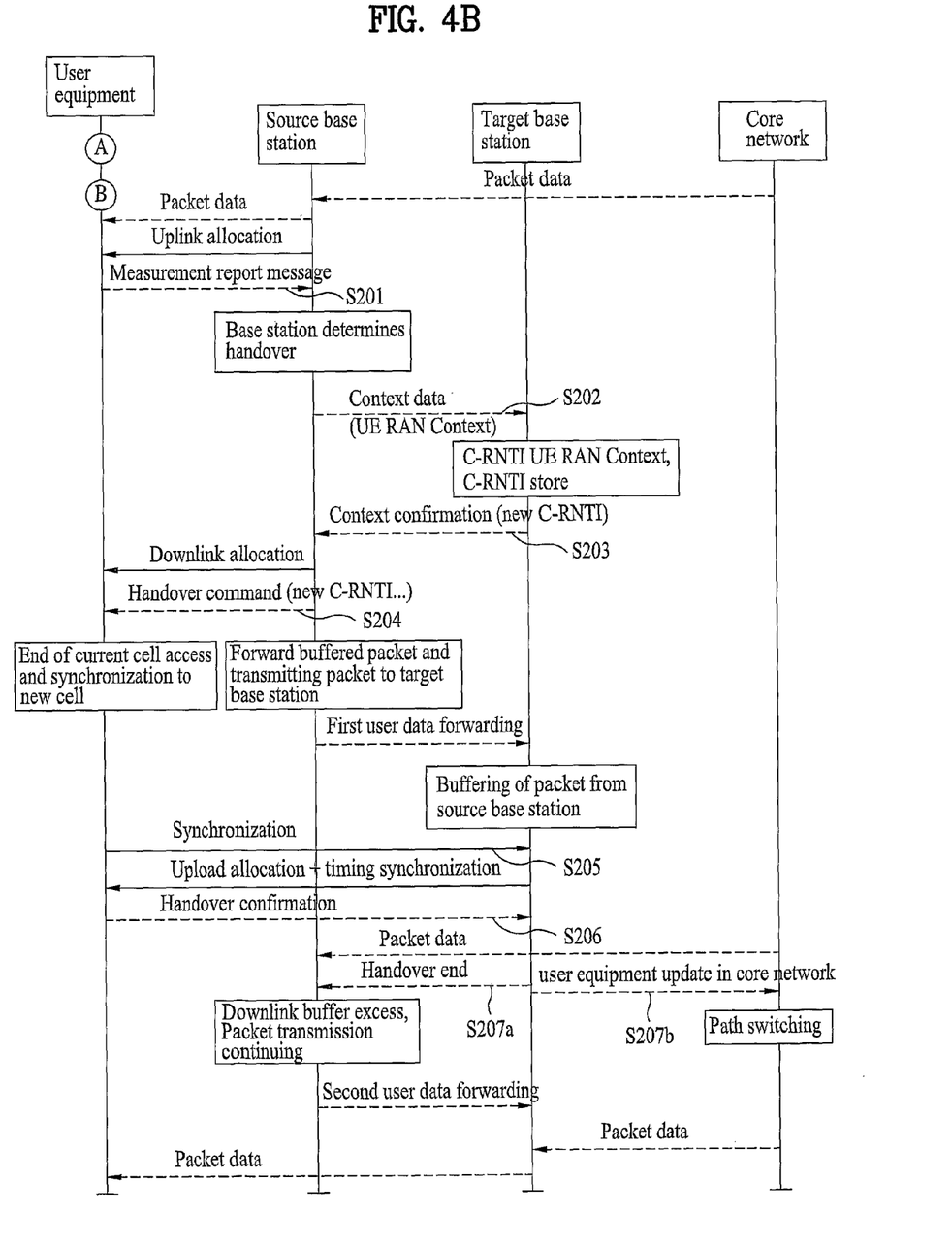
FIG. 4B is a flow chart sequentially illustrating signal flows in a procedure of performing handover.

Hereinafter, a procedure of a method of performing status information report in accordance with the preferred embodiment of the present invention will be described based on the aforementioned UMTS. For reference, FIG. 4A is a flow chart illustrating a method of transmitting status information in accordance with the preferred embodiment of the present invention, and FIG. 4B is a flow chart sequentially illustrating signal flows in a procedure of performing handover.

In this embodiment, when a user equipment receives user data of a downlink, a procedure of transmitting status information to a base station and a procedure of performing handover will be described. Accordingly, during status report, the user equipment transmits received status information to a network by including the same in the RLC status PDU.

If a previously set status, i.e., a previously set event occurs in the user equipment or if one or more conditions are satisfied (S101), the user equipment changes a status information transmission policy depending on a corresponding status (S102). The user equipment transmits RLC status report to the base station depending on the changed policy (S103).

If re-transmission is requested from the base station as the base station has not successively received the RLC status report (S104), the user equipment re-transmits the corresponding RLC status report to the base station (S105).

RLC Status Report

The RLC status report includes reception status information of downlink data blocks transmitted from the base station to the user equipment. In other words, the RLC status report may include either status information of data blocks which have been successfully received, data blocks which have been failed in reception, and data blocks which have been successfully received but have not been decoded normally, among the data blocks of the downlink, transmitted from the base station, or information of requesting re-transmission of data blocks which have been failed in reception or have been received abnormally.

Status Information Transmission Policy

In FIG. 4A, change of the status information transmission policy can be performed by changing a set value of at least one parameter used by the RLC entity of the user equipment to allow the user equipment to perform status report to the base station.

Examples of the parameter used by the RLC entity of the user equipment include set values of various timers used by the RLC entity for status report. Specifically, examples of the parameter used by the RLC entity of the user equipment include Timer_status_periodic which is a transmission period parameter of the RLC status report, Timer_poll which is a transmission period parameter of polling to allow the base station to request the user equipment to perform status report, and Timer_status_prohibit which is a minimum period parameter to prohibit the RLC entity of the user equipment from performing status report.

The user equipment can change the status information transmission policy in such a way to increase or decrease at least one of parameter set values related to status report if a previously set status occurs. Selectively, the listed set parameter is divided into a first value for a general status and a second set value for a specific status which is previously set. In this way, the first value is used in a general status while the second set value is used in a specific status, whereby at least one among the aforementioned timer values can be increased or decreased.

The aforementioned parameters can be forwarded from the RRC or the base station and then set when the RLC entity of the user equipment is set.

Previously Set Status

The previously set status can occur depending on the result of measuring signal quality of a cell to which the user equipment is currently connected and/or a neighboring cell. In this case, signal quality of a cell can be identified by strength of a reference signal transmitted from a base station of a corresponding cell, a bit error rate (BER), a frame error rate (FER), etc.

Examples of the previously set status include a status where signal quality of a cell to which the user equipment is currently connected is reduced to a value less than a previously set value, a status where signal quality of a cell to which the user equipment is currently connected becomes poorer than signal quality of a neighboring cell, a status where signal quality of a neighboring cell is enhanced to a value more than a previously set value, a status where a cell of best quality is changed among cells whose signal quality is measured by the user equipment, and a status where the user equipment has transmitted a measurement report to the base station.

The above statuses are common to one another in that they correspond to an initial step for performing handover in the user equipment. In this case, it is preferable that Timer_status_periodic or Timer_poll is short to more frequently transmit status information and frequently check the transmission status.

However, it is to be understood that the previously set status is not limited to the aforementioned examples only. Examples of the previously set status may include statuses opposite to the aforementioned examples, i.e., the status where communication quality of a cell to which the user equipment is currently connected is increased to a value more than a previously set value, the status where communication quality of a cell to which the user equipment is currently connected becomes better than communication quality of a neighboring cell, and the status where communication quality of a neighboring cell is reduced to a value less than a previously set value. In this case, it is preferable that Timer_status_periodic or Timer_poll is relatively long to occasionally transmit status information and occasionally check the transmission status.

Transmission of RLC Status Report

In principle, if a previously set status occurs, the RLC state report message is repeatedly transmitted until the base station reports that a corresponding message has been successfully received therein. It is preferable that handover is performed after successful reception of the message is reported if handover is requested from the base station.

However, if a previously set status occurs, transmission of the RLC status report can be limited to the number of times previously set in the user equipment. This is because that although the RLC status report is needed to be exactly transmitted to the base station, desirable communication cannot be maintained continuously if a too long time passes for exact message transmission when it is intended to perform handover in the boundary of cells.

Reception Status Report of RLC Status Report

The base station can use a physical layer channel, such as channel quality information channel (CQI channel), pilot channel, and L1/L2 control channel, to report a reception status of the RLC status report. In other words, if the status report is received from the RLC entity of the user equipment, the base station transmits the reception status of the status report to the user equipment through a physical layer channel such as CQI channel, pilot channel, and L1/L2 control channel. If the reception status of the status report is received from the base station, the physical layer of the user equipment reports the reception status to the RLC layer of the user equipment.

In case of the CQI channel, the base station sets CQI to a previously set specific value and then transmits the set value to the user equipment to report the reception status of the status report. In case that the CQI set to the specific value is received in the user equipment when the user equipment monitors the CQI channel, the user equipment can determine that the RLC status report has been successfully received.

In case of the pilot channel, the base station transmits a specific pilot pattern, which is previously set, to the user equipment to report the reception status of the status report. If the pilot channel of the specific pattern is received, the user equipment can determine that the RLC status report has been successfully received.

The L1/L2 control channel is to report allocation information of radio resources of a downlink and an uplink to each user equipment, and the base station can transmit information as to whether the RLC status report has been successfully received, through the L1/L2 control channel.

FIG. 4B is a flow chart illustrating a handover procedure according to the preferred embodiment of the present invention.

If a status which satisfies a predetermined condition occurs, the user equipment a measurement report to the base station (S201), wherein the predetermined condition is previously set. At this time, if the user equipment transmits the measurement report to the base station at a predetermined number of times or greater, use of the changed status information transmission policy can be stopped.

The source base station (source eNB) determines handover with reference to the measurement report received from the user equipment. The source base station transmits a handover preparation message to the target base station (target eNB), wherein the handover preparation message includes context data (S202).

The target base station forwards resource setup information (context confirmation) of the user equipment to the source base station along with a new temporary identifier (C-RNTI) of the user equipment after ensuring resources to be allocated to the corresponding user equipment (S203). If the user equipment receives a handover command from the source base station (S204), the source base station starts transmission of user data to the target base station.

The user equipment resets the wireless environment in such a way to synchronize timing with respect to the target base station (S205). If the target base station responds to the user equipment by using timing information, the user equipment transits a handover confirmation message to the target base station (S206).

The target base station reports success of handover to the source base station (S207a), and the location of the user equipment is updated in a core network (MME/UPE) (S207b).

Meanwhile, the user equipment may continue to use the parameter set value of the RLC entity even after moving to a new cell when a previously set event occurs or a status which satisfies a predetermined condition occurs. Alternatively, the user equipment may use a new parameter set value of the RLC entity, which has been forwarded from a base station of a new cell, after moving to the new cell. Also, when moving to the new cell, the user equipment may be commanded from the base station to stop use of the changed parameter set value of the RLC entity. In this case, the user equipment may use the new parameter set value of the RLC entity, which has been forwarded from the base station of the new cell, as described above. Alternatively, the user equipment may again use the parameter set value which corresponds to a value before change.

Figure 5:
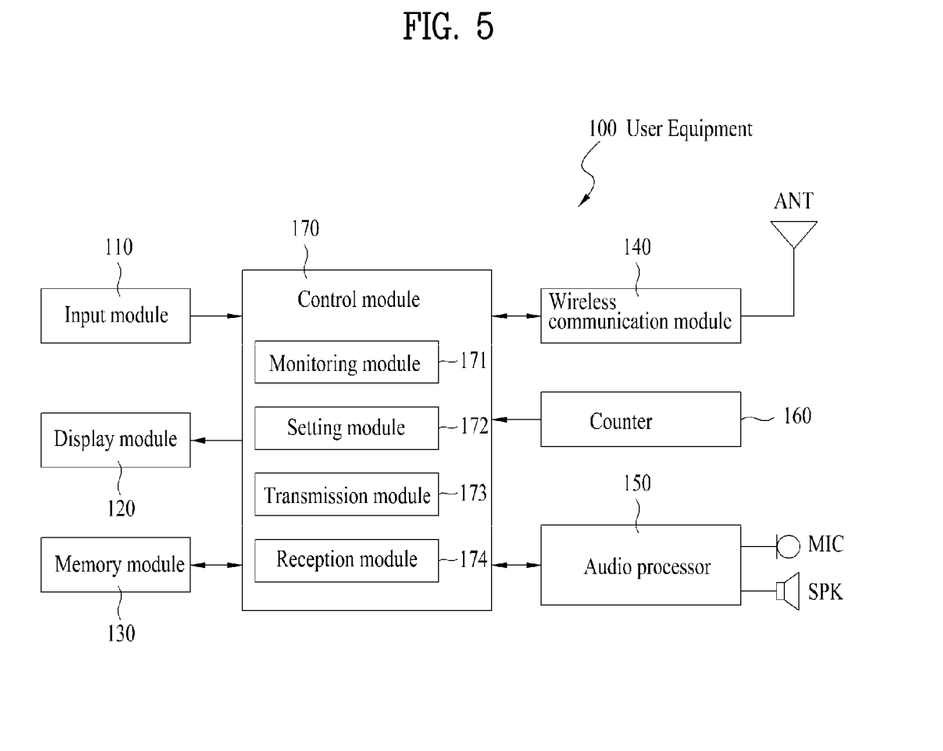
FIG. 5 is a block diagram illustrating a main configuration of a user equipment which is a transmitting side of RLC status report.

A configuration of the user equipment for implementing the aforementioned method of transmitting a status report will be described below. FIG. 5 is a block diagram illustrating a main configuration of the user equipment which is a transmitting side of the RLC status report.

The user equipment 100 includes an input module 110 for selecting a desired function or inputting information, a display module 120 displaying various kinds of information for operating the user equipment 100, a memory module 130 for storing various programs required to operate the user equipment 100 or data to be transmitted to a receiving side, a wireless communication module 140 for receiving an external signal and transmitting data to the receiving side, an audio processor 150 for converting a digital audio signal into an analog audio signal, amplifying the converted audio signal, and outputting the amplified signal to a speaker (SP) or amplifying an audio signal from a mike (MIC) and converting the amplified audio signal into a digital audio signal, a counter 160 for performing transmission of status information as much as the number of times which are previously set, and a control module 170 for controlling entire driving of the user equipment 100.

In this case, the control module 170 includes a monitoring module 171 for checking whether a previously set status occurs, a setting module 172 for changing the status information transmission policy of the user equipment in accordance with the occurring status, and a transmission module 173 for transmitting status information of the user equipment to the base station in accordance with the changed policy.

At this time, the setting module 172 changes the set parameter used in the RLC entity of the user equipment in accordance with the occurring status.

Meanwhile, the user equipment 100 may further include a receiving module 174 for receiving information as to whether the status information has been successfully received, from the base station.

Furthermore, the transmission module may further include a function of repeatedly performing transmission of the status information until successful reception is reported from the base station.

According to the present invention, since the base station and the user equipment can exactly identify user data, which have been successfully transmitted, before handover, unnecessary repeated transmission can be avoided after handover, thereby enhancing transmission efficiency and efficiently using network resources.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the base station and the user equipment. In this case, the base station means a terminal node of a network which directly performs communication with the user equipment. A specific operation which has been described herein as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the method according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the random access method in the mobile communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention is applicable to a wireless communication system such as a mobile communication system and a wireless internet system.

The invention claimed is:

1. A method of transmitting a reception status report in a radio link control (RLC) protocol layer of a user equipment (UE) which receives data transmitted from a base station in a mobile communication system, the method comprising:
periodically transmitting the reception status report of at least one first data block in the RLC protocol layer every first time period value (T1) of at least one parameter associated with the reception status report, the at least one first data block being transmitted from the base station;

changing the first time period value (T1) of the at least one parameter to a second time period value (T2) if at least one predefined condition is satisfied; and periodically transmitting reception status report of at least one second data block every second time period value (T2) of the at least one parameter, the at least one second data block being transmitted from the base station, wherein the at least one parameter includes a time period value for transmitting the reception status report, wherein the at least one predefined condition is satisfied if intensity of a reference signal transmitted from the base station becomes smaller than a predefined first threshold value, if intensity of a reference signal transmitted from a neighboring base station becomes greater than a predefined second threshold value, or when the user equipment transmits a measurement report message to the base station, and wherein the second time period value (T2) is smaller than the first time period value (T1).

2. The method of claim 1, wherein the at least one parameter further includes a request period which the base station requests the user equipment to transmit the reception status report.

3. The method of claim 1, further comprising
performing a handover to a target base station,
wherein the second time period value (T2) of the at least one parameter is maintained after the handover is completed.

4. The method of claim 1,
further comprising:
receiving information including a third time period value (T3) of the at least one parameter; and
changing the second time period value (T2) of the at least one parameter to the third time period value (T3).

5. The method of claim 1, wherein the at least one predefined condition is satisfied if one of the base station and at least one neighboring base station, which transmits the reference signal with a greatest intensity, is changed.

6. A user equipment (UE) for transmitting reception status report of data transmitted from a base station in a mobile communication system, the user equipment is set to perform the steps of:

periodically transmitting reception status report of at least one first data block in the radio link control (RLC) protocol layer every first time period value (T1) of at least one parameter, the at least one first data block being transmitted from the base station;

changing the first time period value (T1) of the at least one parameter to a second time period value (T2) if a previously set event occurs or if at least one predefined condition is satisfied, wherein the second time period value (T2) is smaller than the first time period value (T1); and periodically transmitting reception status report of at least one second data block every the second time period value (T2) of the at least one parameter, the at least one second data block being transmitted from the base station, wherein the at least one parameter includes a time period value for transmitting the reception status report, wherein the at least one predefined condition is satisfied if intensity of a reference signal transmitted from the base station becomes smaller than a predefined first threshold value, if intensity of a reference signal transmitted from a neighboring base station becomes greater than a predefined second threshold value, or when the user equipment transmits a measurement report message to the base station, and wherein the second time period value (T2) is smaller than the first time period value (T1).

* * * * *